US012647343B2

(12) United States Patent
Manickam et al.

(10) Patent No.: US 12,647,343 B2
(45) Date of Patent: Jun. 2, 2026

(54) SYMMETRIC ROUTING AND SPLIT-BRAIN HANDLING IN SOFTWARE-DEFINED HIGH AVAILABILITY NETWORKS

(71) Applicant: Cisco Technology, Inc., San Jose, CA (US)

(72) Inventors: Arul Murugan Manickam, San Jose, CA (US); Satyajit Das, Livermore, CA (US); Avinash Shah, Pleasanton, CA (US); Pritam Baruah, Fremont, CA (US); Michael Tracy, Petaluma, CA (US); Satish Kumar Mahadevan, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 18/427,224

(22) Filed: Jan. 30, 2024

(65) Prior Publication Data

US 2025/0247320 A1     Jul. 31, 2025

(51) Int. Cl.
*H04L 12/46*       (2006.01)
*H04L 45/00*       (2022.01)
*H04L 45/03*       (2022.01)
(52) U.S. Cl.
CPC .......... *H04L 45/03* (2022.05); *H04L 12/4641* (2013.01); *H04L 45/38* (2013.01)
(58) Field of Classification Search
CPC ...... H04L 45/03; H04L 12/4641; H04L 45/38
USPC ....................................................... 709/238
See application file for complete search history.

(56) References Cited

U.S. PATENT DOCUMENTS

| | | | | |
|---|---|---|---|---|
| 7,636,917 | B2 * | 12/2009 | Darling ................... | H04L 67/61 709/227 |
| 8,060,776 | B1 * | 11/2011 | Schoenthal ......... | G06F 11/2069 714/6.23 |
| 10,003,531 | B2 * | 6/2018 | Zhou .................... | H04L 12/4633 |
| 10,999,159 | B2 * | 5/2021 | Enguehard ............ | G06F 9/5077 |
| 2014/0341226 | A1 | 11/2014 | Okita | |
| 2016/0210209 | A1 * | 7/2016 | Verkaik ............... | G06F 11/2028 |
| 2016/0261486 | A1 | 9/2016 | Fang et al. | |

(Continued)

OTHER PUBLICATIONS

"Cisco SD-WAN Design guide" (Year: 2020).*

(Continued)

*Primary Examiner* — Moustafa M Meky
*Assistant Examiner* — Kidest Mendaye
(74) *Attorney, Agent, or Firm* — Polsinelli P.C.

(57) ABSTRACT

The present disclosure includes systems and methods for symmetric routing and split-brain handling in high-availability (HA) networks using route priority and route affinity inversion. In one aspect, the method includes receiving, at a controller associated with a communication network, first status information associated with at least one of a first node or a second node. The first node and the second node are used in service of a first VPN. The controller determines, from the first status information, a preference associated with the first node over the second node for servicing traffic of the first VPN, and generates routing information for a third node of the communication network. The routing information specifies that the first node is preferred for serving traffic of the first VPN, and that the second node is available, but less preferred for servicing traffic of the first VPN.

20 Claims, 6 Drawing Sheets

GROUP RIB IN 236

| Node | Availability | State | Priority | Affinity | VPN |
|---|---|---|---|---|---|
| N1 | Yes | A | 255 | 1 | 1 |
| N1 | Yes | A | 200 | 2 | 2 |
| N2 | Yes | A | 200 | 2 | 1 |
| N2 | Yes | A | 255 | 1 | 2 |

GROUP RIB OUT 238

| VPN | Route | Route Preference |
|---|---|---|
| 1 | N1 | 100 |
| 2 | N2 | 100 |

CONTROLLER 202

GROUP 210

N1 206

VPN1 212

VPN2 214

N2 208

N3 204

N3 GROUP RIB IN 240

| VPN | Route | Route Preference |
|---|---|---|
| 1 | N1 | 100 |
| 2 | N2 | 100 |

N3 GROUP FIB 242

| VPN | Route |
|---|---|
| 1 | N1 |
| 2 | N2 |

(56) References Cited

U.S. PATENT DOCUMENTS

| 2017/0163473 A1* | 6/2017 | Sadana ................... H04L 47/41 |
| 2018/0081770 A1 | 3/2018 | Fries et al. |
| 2018/0176073 A1* | 6/2018 | Dubey ................. H04L 69/325 |
| 2019/0312914 A1 | 10/2019 | Cohn |
| 2019/0318338 A1* | 10/2019 | Verma ................... H04L 9/0637 |
| 2021/0306261 A1* | 9/2021 | Duan ..................... H04L 43/10 |
| 2022/0070146 A1 | 3/2022 | Gerstel |
| 2022/0182313 A1* | 6/2022 | Manickam ............ H04L 45/586 |
| 2022/0255900 A1* | 8/2022 | Gupta .................... H04L 67/61 |
| 2023/0105744 A1 | 4/2023 | Lin et al. |
| 2024/0235999 A1* | 7/2024 | Zhang ................ H04L 12/4641 |

OTHER PUBLICATIONS

International Search Report and Written Opinion for International Application No. PCT/US2025/011852, mailed Apr. 17, 2025, 11 Pages.

* cited by examiner

GROUP RIB OUT 218

| VPN | Route | Route Preference |
|---|---|---|
| 1 | N1 | 100 |
| 2 | N1 | 1 |
| 1 | N2 | 1 |
| 2 | N2 | 100 |

GROUP RIB IN 216

| Node | Availability | State | Priority | Affinity | VPN |
|---|---|---|---|---|---|
| N1 | Yes | A | 255 | 1 | 1 |
| N1 | Yes | S | 200 | 2 | 2 |
| N2 | Yes | S | 200 | 2 | 1 |
| N2 | Yes | A | 255 | 1 | 2 |

CONTROLLER 202

GROUP 210

N1 206

N2 208

VPN1 212

VPN2 214

N3 204

N3 GROUP RIB IN 220

| VPN | Route | Route Preference |
|---|---|---|
| 1 | N1 | 100 |
| 2 | N1 | 1 |
| 1 | N2 | 1 |
| 2 | N2 | 100 |

N3 GROUP FIB 222

| VPN | Route |
|---|---|
| 1 | N1 |
| 2 | N2 |

GROUP RIB OUT 228

| VPN | Route | Route Preference |
|-----|-------|------------------|
| 1 | N1 | 100 |
| 2 | N1 | 100 |

GROUP RIB IN 226

| Node | Availability | State | Priority | Affinity | VPN |
|------|--------------|-------|----------|----------|-----|
| N1 | Yes | A | 255 | 1 | 1 |
| N1 | Yes | A | 200 | 1 | 2 |
| N2 | No | U | 200 | 2 | 1 |
| N2 | No | U | 255 | 2 | 2 |

N3 GROUP RIB IN 230

| VPN | Route | Route Preference |
|-----|-------|------------------|
| 1 | N1 | 100 |
| 2 | N1 | 100 |

N3 GROUP FIB 232

| VPN | Route |
|-----|-------|
| 1 | N1 |
| 2 | N1 |

CONTROLLER 202

N3 204

GROUP 210

N1 206

N2 208

VPN1 212

VPN2 214

GROUP RIB IN 236

| Node | Availability | State | Priority | Affinity | VPN |
|------|--------------|-------|----------|----------|-----|
| N1 | Yes | A | 255 | 1 | 1 |
| N1 | Yes | A | 200 | 2 | 2 |
| N2 | Yes | A | 200 | 2 | 1 |
| N2 | Yes | A | 255 | 1 | 2 |

GROUP RIB OUT 238

| VPN | Route | Route Preference |
|-----|-------|------------------|
| 1 | N1 | 100 |
| 2 | N2 | 100 |

N3 GROUP RIB IN 240

| VPN | Route | Route Preference |
|-----|-------|------------------|
| 1 | N1 | 100 |
| 2 | N2 | 100 |

N3 GROUP FIB 242

| VPN | Route |
|-----|-------|
| 1 | N1 |
| 2 | N2 |

VPN1 212

VPN2 214

GROUP 210

N1 206

N2 208

CONTROLLER 202

N3 204

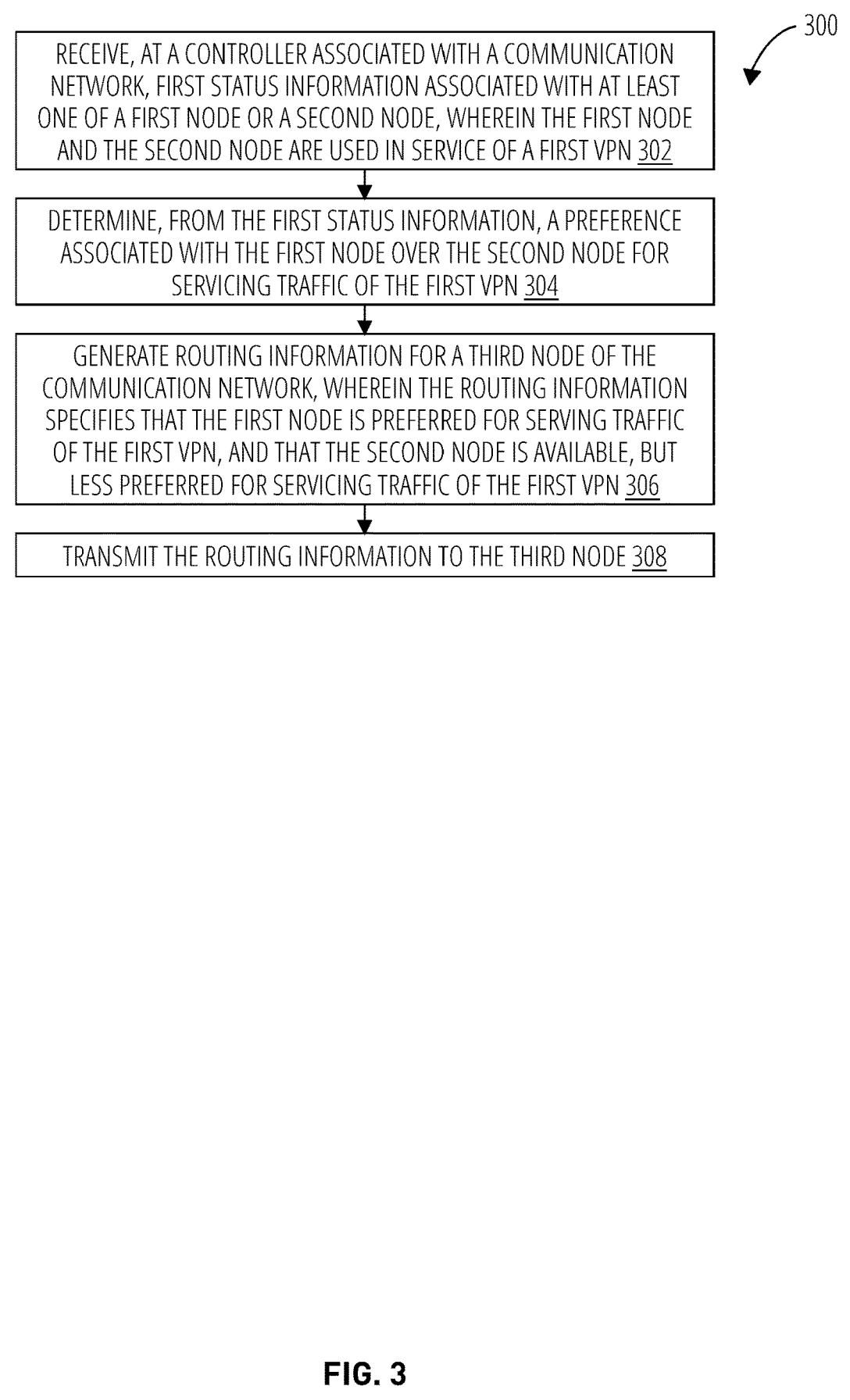

300

RECEIVE, AT A CONTROLLER ASSOCIATED WITH A COMMUNICATION NETWORK, FIRST STATUS INFORMATION ASSOCIATED WITH AT LEAST ONE OF A FIRST NODE OR A SECOND NODE, WHEREIN THE FIRST NODE AND THE SECOND NODE ARE USED IN SERVICE OF A FIRST VPN 302

DETERMINE, FROM THE FIRST STATUS INFORMATION, A PREFERENCE ASSOCIATED WITH THE FIRST NODE OVER THE SECOND NODE FOR SERVICING TRAFFIC OF THE FIRST VPN 304

GENERATE ROUTING INFORMATION FOR A THIRD NODE OF THE COMMUNICATION NETWORK, WHEREIN THE ROUTING INFORMATION SPECIFIES THAT THE FIRST NODE IS PREFERRED FOR SERVING TRAFFIC OF THE FIRST VPN, AND THAT THE SECOND NODE IS AVAILABLE, BUT LESS PREFERRED FOR SERVICING TRAFFIC OF THE FIRST VPN 306

TRANSMIT THE ROUTING INFORMATION TO THE THIRD NODE 308

FIG. 3

SYMMETRIC ROUTING AND SPLIT-BRAIN HANDLING IN SOFTWARE-DEFINED HIGH AVAILABILITY NETWORKS

TECHNICAL FIELD

The present technology pertains to high availability networks, and, more specifically, to symmetric routing and split-brain handling using route priority and route affinity in high availability networks.

BACKGROUND

High Availability (HA) routing is a crucial aspect of network design that ensures continuous and reliable communication by minimizing downtime and disruptions. In HA routing, redundant paths and devices are strategically implemented to maintain network connectivity even in the face of hardware failures, network congestion, or other unforeseen issues. This approach enhances the resilience of the network by automatically redirecting traffic to alternative routes or devices when a failure is detected. Common techniques employed in HA routing include load balancing, failover mechanisms, and the use of protocols such as Virtual Router Redundancy Protocol (VRRP) or Hot Standby Router Protocol (HSRP). By prioritizing redundancy and swift failover, HA routing contributes to the overall availability and dependability of network infrastructures, ensuring that businesses and users experience minimal disruptions in their connectivity.

BRIEF DESCRIPTION OF THE DRAWINGS

To easily identify the discussion of any particular element or act, the most significant digit or digits in a reference number refer to the figure number in which that element is first introduced.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 3 illustrates an example flowchart illustrating symmetric routing and split-brain handling using route priority and route affinity in high availability networks according to some aspects of the present disclosure.

DETAILED DESCRIPTION

Figure 1:
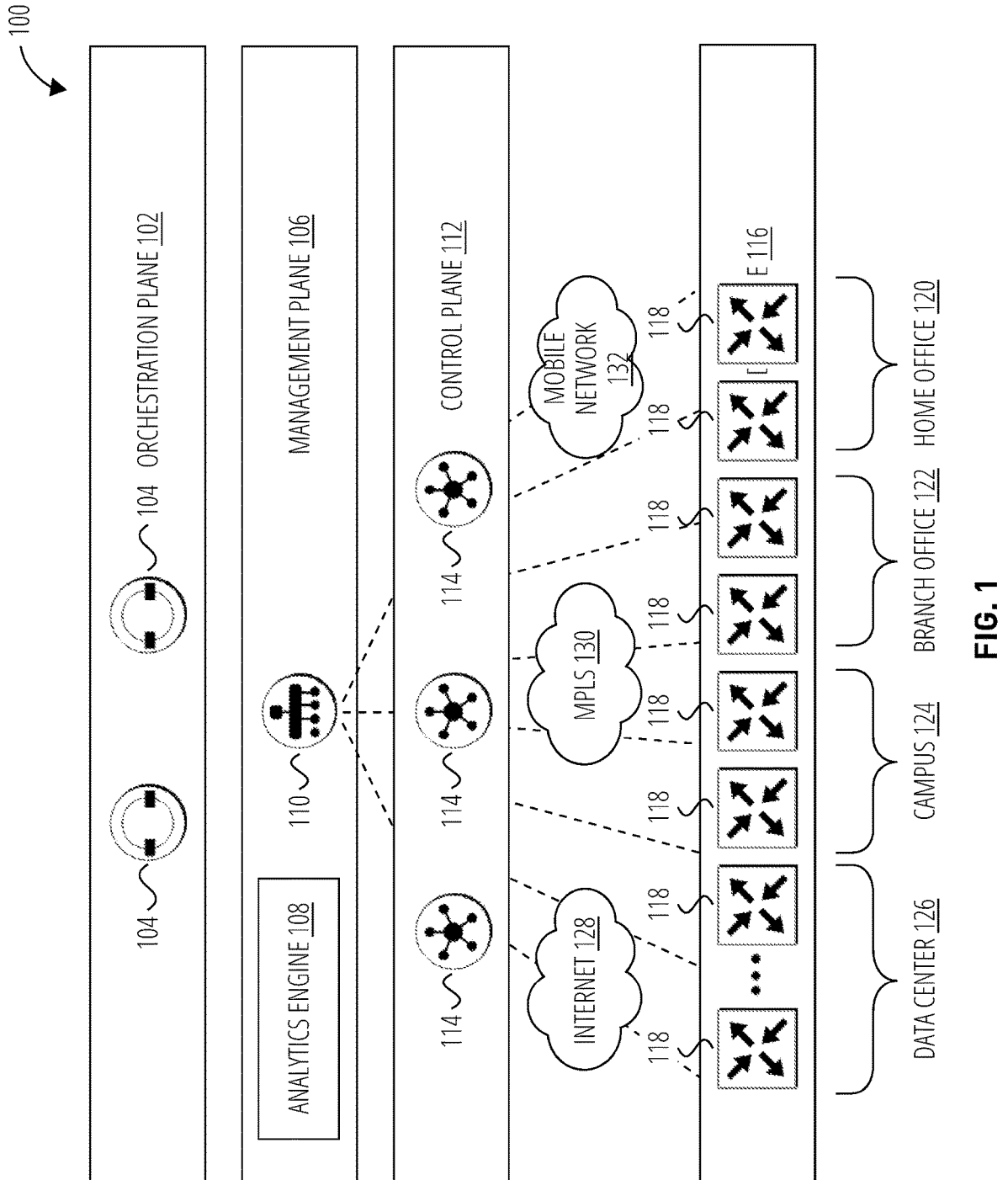
FIG. 1 illustrates an example of a high-level network architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

OVERVIEW

The present disclosure includes systems and methods for symmetric routing and split-brain handling in high-availability (HA) networks using route priority and route affinity. In one aspect, the method includes receiving, at a controller associated with a communication network, first status information associated with at least one of a first node or a second node. The first node and the second node are used in service of a first VPN. The controller determines, from the first status information, a preference associated with the first node over the second node for servicing traffic of the first VPN, and generates routing information for a third node of the communication network. The routing information specifies that the first node is preferred for serving traffic of the first VPN, and that the second node is available, but less preferred for servicing traffic of the first VPN.

In another aspect, the method also includes transmitting the routing information to the third node.

In another aspect, the first node and the second node belong to a first resource group. The first resource group services traffic to and from a first server. The first node is active for servicing the traffic of the first VPN and the second node is standby for servicing traffic of the first VPN.

In another aspect, the first status information indicates that the first node is available, where the availability indicates the connectivity of the first node to the communication network.

In another aspect, the method also includes receiving second status information containing changed status information for at least one of the first node or the second node. The changed status information includes a route affinity inversion for the first node and the second node that indicates that the first node is now active for the second VPN. The controller may generate updated routing information for the third node indicating that the first node is preferred for serving traffic of the second VPN by according to the route affinity inversion.

In another aspect, the routing information for the third node specifies that the first node is preferred for serving traffic of the first VPN by indicating a route affinity toward the first node for the traffic of the first VPN.

In another aspect, the routing information for the third node includes a first priority associated with the first node and a second priority associated with the second node. The first priority and the second priority indicate a preference for the first node for the traffic of the first VPN.

In another aspect, the first priority is generated at the first node and the second priority is generated at the second node, and where the first priority and the second priority are indicative of a health metric.

In another aspect, the first status information indicates that the second node of the first resource group is active for servicing the traffic of a second VPN and the first node is standby for servicing traffic of the second VPN. The routing information for the third node specifies that the second node is preferred for serving traffic of the second VPN by indicating a route affinity toward the second node for the traffic of the second VPN.

In another aspect, the routing information for the third node includes a first priority associated with the first node and a second priority associated with the second node. The first priority and the second priority indicate a preference for the second node for the traffic of the second VPN.

In another aspect, the updated routing information for the third node includes a first priority associated with the first node and a second priority associated with the second node. The first priority and the second priority indicate a preference for the first node for the traffic of the second VPN. Other technical features may be readily apparent to one skilled in the art from the following figures, descriptions, and claims.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for symmetric routing and split brain handling in software-defined High Availability (HA) networks. HA and Seamless Failover on failure is crucial for any business-critical application. HA active/standby and seamless failover solutions are widely deployed and are provided by multiple vendors. Generally, HA means that there are standby routers in a network that can takeover traffic if an active router fails. Seamless failover means that the states are synced between routers (e.g., from Active to Standby), such that the flow can survive across a takeover. In a typical deployment, all traffic would be directed at the active router. In the instance that traffic is directed to the standby router, the standby router would redirect the traffic to the active router for processing. Redirecting the traffic to the active router causes an increased amount of processing power necessary to transmit traffic. Additionally, this causes an extra hop which can increase end-to-end application latency.

The solution described herein includes two different methods for identifying the active router in an HA pair by storing and transmitting routing information at a central controller, thereby reducing excess processing power, providing updated routing information to routers associated with a network, solving a split-brain networking issue, and overall improving network performance. In addition to generic availability of a node (e.g., connectivity to the network), the solution incorporates a route priority and a route affinity, which are two indicators of preference for a particular route associated with a VPN. For example, the route priority and the route affinity may indicate a preference for node A for traffic associated with VPN 1.

The route priority may be determined by one or more network metrics, including, but not limited to, latency, connectivity, bandwidth, processing, hardware functionality, etc. The route affinity may be determined according to the network setup of one or more nodes and an affiliated HA pair. For example, the "active" router for VPN 1 may be given an affinity of "1," while the "standby" router for VPN 1 may be given an affinity of "2." The priorities and affinities for the nodes may be advertised by the respective nodes and stored at a central controller. Using the advertisements, the central controller may generate routing information for one or more VPNs associated with the network and transmit the routing information to nodes throughout the network.

Upon failure of an active node, the central controller may dynamically update the affinity and routing information accordingly. This avoids the "switchover" that may occur from redirecting traffic to the standby router upon failure of the active router. Route priority may be dynamically updated according to metrics gathered from the active and standby node. The metrics, upon failure of the active node, may indicate the failure and the central controller may update the routing information accordingly. Using two metrics also alleviates the "split-brain" problem, where, for example, node A may be preferred for VPN 1 and standby for VPN 2, while node B may be preferred for VPN 2 and standby for VPN 1. Since both nodes are "active," both nodes may advertise "active," which causes the split brain problem. Utilizing both the route priority in conjunction with the route affinity solves this problem assigning a route priority per node per VPN (e.g., node A would be associated with a route priority for VPN 1 and VPN 2).

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include an analytics engine 108, which may aggregate telemetry data and correlate analytics to provide insights associated with the network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multi-plexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2A:
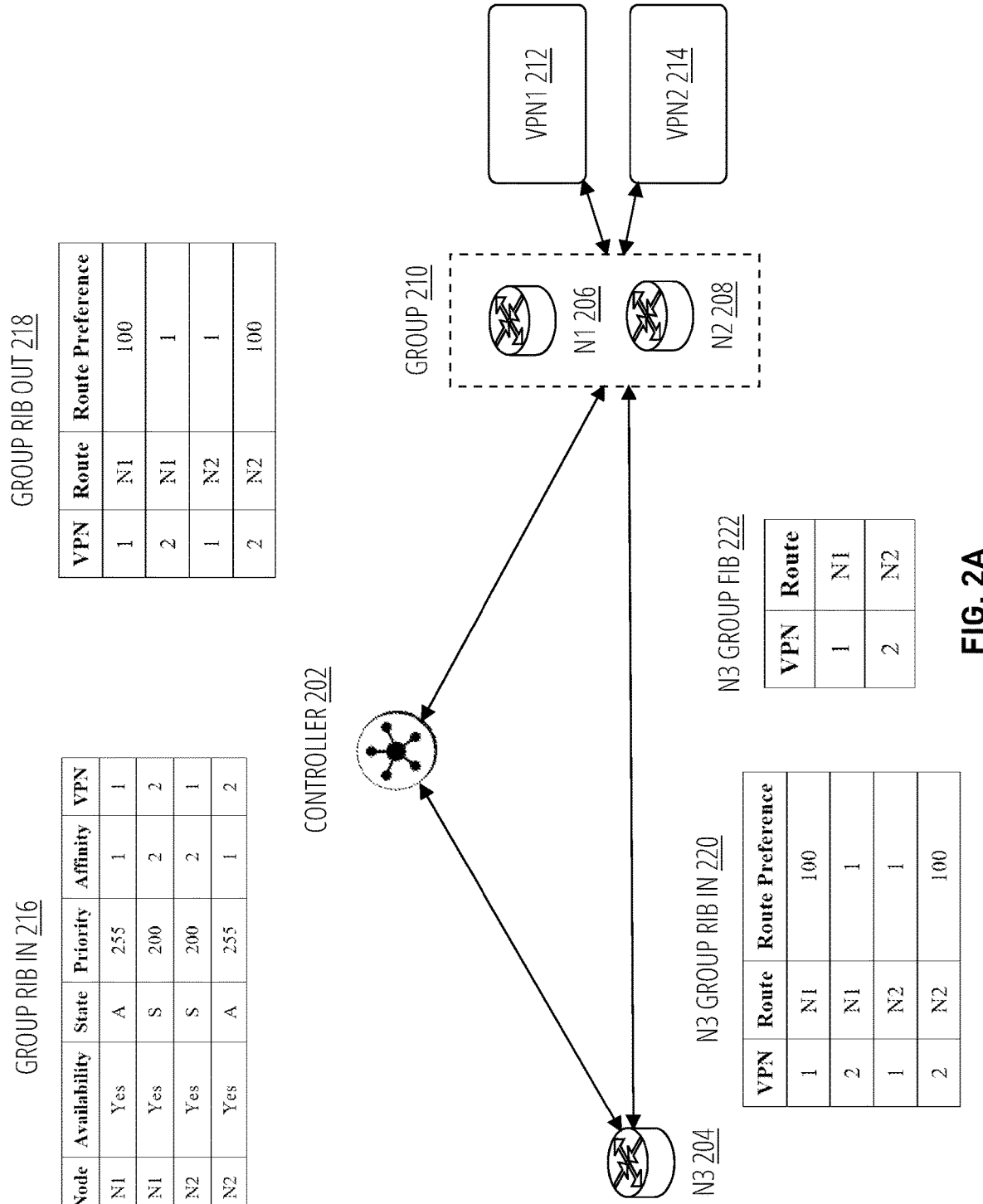
FIG. 2A illustrates an example diagram illustrating symmetric routing and split-brain handling using route priority and route affinity in high availability networks according to some aspects of the present disclosure.

FIG. 2A illustrates an example diagram illustrating symmetric routing and split-brain handling using route priority and route affinity in high availability networks according to some aspects of the present disclosure. The system shown in FIG. 2A may be implemented using a network similar to the network described in FIG. 1. For example, controller 202 may be included in control plane 112 and N1 206, N2 208, and N3 204 may be included in data plane 116. In some examples, N1 206 and N2 208 may be members of group 210, which facilitates the transmission of data to and from VPN1 212 and VPN2 214. For example, group 210 may route data from N3 204 to N1 206 and/or N2 208 accordingly.

In some examples, N1 206 and N2 208 may be configured in a high-availability (HA) scenario, where an "active" and a "standby" route exists to decrease latency and communication failures upon failure of a route. For example, the "standby" route may be used after failure of the "active" route. As shown in FIG. 2A, N1 206 may be "active" for VPN1 212 and "standby" for VPN2 214. N2 208 may be "active" for VPN2 214 and "standby" for VPN1 212. Group 210, including N1 206 and N2 208, advertises the HA configuration to associated controllers and/or other nodes (e.g., N3 204). The advertisements may also include an availability status of relevant node (e.g., N1 206 may advertise the availability of N1 206) that indicates whether or not a node is available to receive and/or forward traffic. The HA configuration included in the advertisements transmitted by the nodes of group 210 may be referred to as "active/active" forwarding, which describes a scenario where the nodes (e.g., N1 206 and N2 208) within the group (e.g., group 210) are "active" for forwarding to a VPN (e.g., VPN1 212 and VPN2 214) and may be "standby" for a second VPN.

In addition to the "active" and "standby" configurations of the nodes within a group, N1 206 and N2 208 may advertise additional data to components within the network. For example, the nodes of group 210 may be associated with a route priority for a particular route. Route priority may refer to the order or preference assigned to different routes within a routing table. Routes with higher priority values are considered more preferable or desirable for data packet transmission. Priority values can be influenced by various factors, including administrative configurations, routing protocol metrics, or other parameters specific to the routing protocol in use. For example, the routes from N1 206 to VPN1 212, from N2 208 to VPN1 212, from N1 206 to VPN2 214, and from N2 208 to VPN2 214, may all be associated with a route priority according to one or more factors. Route priority may be calculated at a respective node of the network (e.g., N1 206 may calculate route priority for associated routes using a processor).

The additional data advertised by the group may also include route affinity. Route affinity may refer to the concept of associating or assigning a specific characteristic or attribute to a route. This characteristic influences the routing decisions made by network devices when determining the optimal path for forwarding data packets. Per-VPN route affinity, as applicable to FIG. 2A, may be dictated by the active/standby state of a pair of devices (e.g., N1 206 and N2 208) and may be configured by a network administrator. By defining route affinity, administrators can tailor the routing decisions to meet specific network performance goals and requirements. For example, the routes from N1 206 to VPN1 212, from N2 208 to VPN1 212, from N1 206 to VPN2 214, and from N2 208 to VPN2 214, may all be associated with a route affinity according to one or more factors.

Controller 202 may receive the advertisements from the nodes of group 210 (e.g., N1 206 and N2 208) and may store and/or access content and/or data of the advertisement accordingly. In some examples, the content and/or data may be maintained in a routing information base (RIB) accessible by controller 202. The RIB may include data pertaining to one or more routes of nodes of a group, including an availability of the node, a state of the node as applicable to a particular route (e.g., "active" or "standby"), a route priority, a route affinity, and an associated serviced VPN (in some examples, the serviced VPN may be represented by a prefix included in an advertisement). Group RIB in 216 may be an example of an in-bound RIB that may include the aforementioned data as it applies to group 210.

As shown group RIB in 216, a route from N1 206 to VPN1 212 may be associated with N1 206 advertising availability with an active state, a route priority of 255, and a route affinity of 1. A route from N1 206 to VPN2 214 may be associated with N1 206 advertising availability with a standby state, a route priority of 200, and a route affinity of 1. A route from N2 208 to VPN1 212 may be associated with N2 208 advertising availability with a standby state, a route priority of 200, and a route affinity of 2. A route from N2 208 to VPN2 214 may be associated with N2 208 advertising availability with an active state, a route priority of 255, and a route affinity of 1. In some examples, the data included in group RIB in 216 may be dynamically updated according to one or more changes in the advertisements from the nodes within group 210. For example, if a change occurs within the network that impacts a route priority associated with a route included within group RIB in 216, the route priority may dynamically change.

Using the data included group RIB in 216, controller 202 may generate an out-bound RIB for distribution to one or more members of the network (e.g., N3 204). The out-bound RIB may include routing information associated with group 210 and associated serviced VPNs (or other services). The routing information may include a route, a route preference, a node, a VPN, and/or any additional information that may improve routing between nodes on the network. For example, group RIB out 218 may be generated at the instruction of controller 202 and may be transmitted to N3 204. Group RIB out 218 may include consolidated data based on group RIB in 216. For example, group RIB out 218 may include a route preference as indicated by the state, route priority, and route affinity indicated by advertisements received from nodes of group 210. The route preference may be determined using a value (e.g., a whole number from 1 to 100, with 100 indicating "most preferred" and a 1 indicating "least preferred"). Route preference may refer to the priority or ranking assigned to different routes for reaching a particular destination. When a node and/or router has multiple paths available to reach a destination on the network, each route may be associated with a preference value. Routes with higher preference values are considered more favorable or preferred by the router. When determining the optimal path for forwarding data packets, the router selects the route with the highest preference. For example, if N3 204 is attempting to transmit data packets to VPN1 212, the route preference indicated in group RIB out 218, N3 group RIB in 220, and N3 group FIB 222 indicates that N3 204 should transmit the data packets via N1 206.

The route preference may be determined by analyzing the availability, the state, the route priority, and the route affinity indicated by advertisements. In some examples, this analysis may include a sequential and/or hierarchical analysis of the contents of group RIB in 216 and/or the advertisements received from nodes of group 210. Data included within the advertisements received from nodes of group 210 may be associated with a particular "weight" or influence on the route preference determination. For example, HA state pairings associated with one or more nodes and a particular VPN (and/or other service) may overrule a determination of route preference based solely on route priority. In some examples, if higher-ranked data in the hierarchical analysis is inconclusive (e.g., HA state is the same, priority is the same, etc.), the analysis may progressively continue to gradually lower-ranked data in the hierarchical analysis to attempt to determine a route preference. For example, the analysis may begin with HA state, then move to route priority, then move to route affinity if both HA state and route priority are inconclusive in determining a route preference.

Group RIB out 218 may be transmitted throughout the network and received by one or more nodes, including, but not limited to, N3 204. N3 204 may receive group RIB out 218 and store and/or access the data included using an internal RIB (e.g., N3 group RIB in 220). Using N3 group RIB in 220, N3 204 and/or an associated processor may generate N3 group FIB 222 that indicates where N3 204 should transmit data packets. For example, according to N3 group FIB 222, N3 204 should always transmit traffic intended for VPN1 212 to N1 206 and traffic intended for VPN2 214 to N2 208.

Figure 2B:
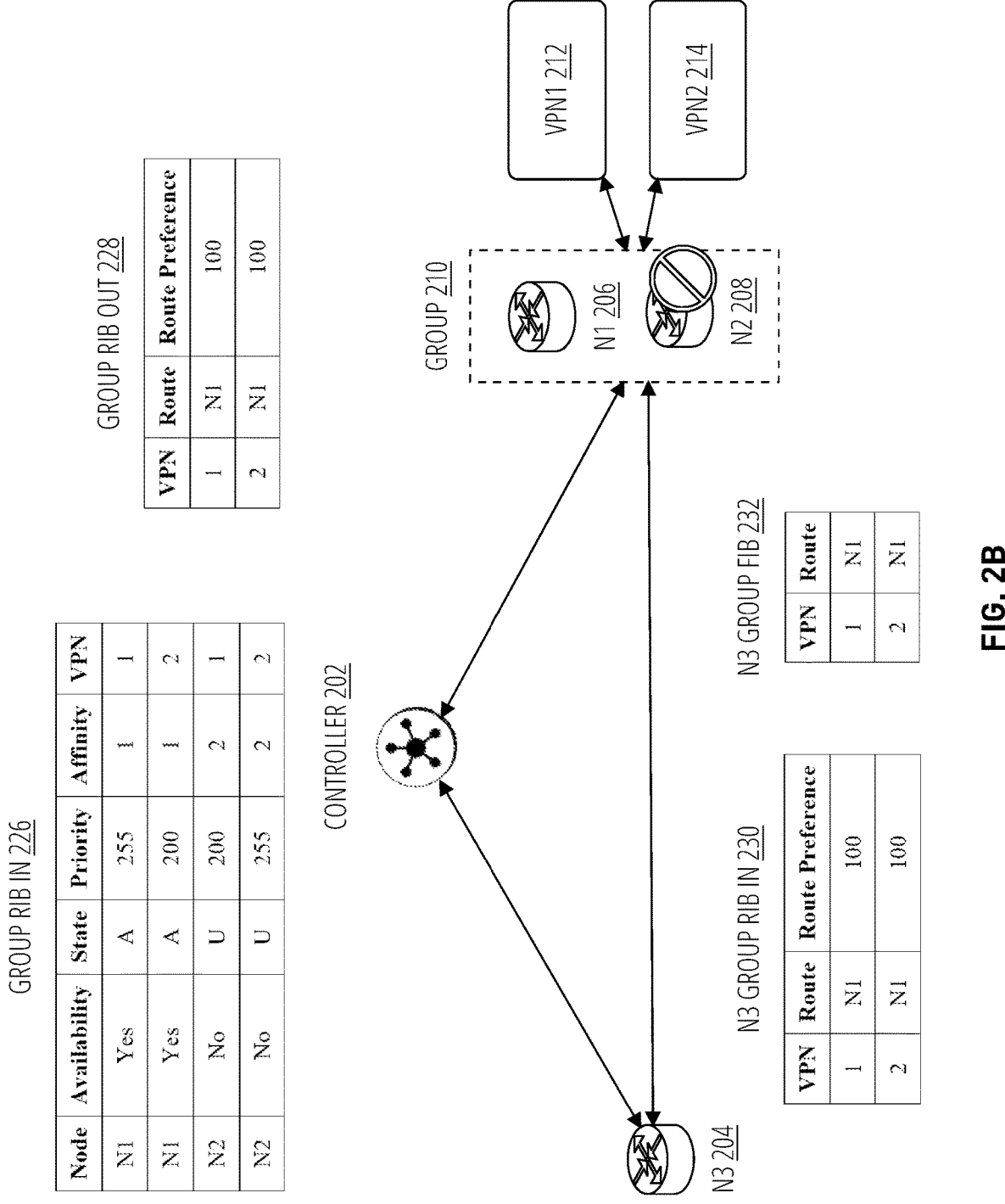
FIG. 2B illustrates an example diagram illustrating symmetric routing and split-brain handling using route priority and route affinity in high availability networks after failure of a node according to some aspects of the present disclosure.

FIG. 2B illustrates an example diagram illustrating symmetric routing and split-brain handling using route priority and route affinity in high availability networks after failure of a node according to some aspects of the present disclosure. In the scenario illustrated by FIG. 2B, N2 208 has failed and is unable to forward traffic (e.g., due to hardware issues, software issues, network updates, etc.). The advertisements from the nodes within group 210 may indicate the failure (e.g., N2 208 is no longer advertising availability, N1 206 is advertising an "active" HA status regarding a route to VPN2 214, N2 208 has an "unknown" HA status, etc.). Accordingly, group RIB in 226 may be generated with updated data. For example, group RIB in 226 demonstrates N2 208 with "no" availability and with an "unknown" or "U" HA status regarding routes associated with VPN1 212 and VPN2 214. In some examples, N2 208 data may be purged from the internal RIB entirely. Group RIB in 226 may be a modified version of group RIB in 216, as described in FIG. 2A.

As shown group RIB in 226, N1 206 may be shown as "active" for routes to VPN1 212 and VPN2 214, however the route priority associated with the routes to VPN1 212 and VPN2 214 may not differ. In some examples, however, the route priority may be recalculated to generate a new determination of route priority for the given routes included group RIB in 226. Additionally, a route affinity associated with the route between N1 206 and VPN2 214 may dynamically changed according to the failure of N2 208. By dynamically inverting the affinity, it eliminates the "extra hop" peer divert (e.g., traffic being routed to N2 208, N2 208 routing the traffic to N1 206, and N1 206 then forwarding the traffic to the destination), thereby improving overall end-to-end network performance.

Group RIB out 228 may be transmitted by controller 202 to one or more nodes within the network (e.g., N3 204). Group RIB out 228 may be an updated version of group RIB out 218, as described in FIG. 2A. Due to the unavailability of N2 208, group RIB out 228 may not include data pertaining to N2 208 and may only include data related to available nodes, such as N1 206. Once received by associated nodes, such as N3 204, N3 204 may store and/or access a local version of group RIB out 228. This local version may be N3 group RIB in 230. Using N3 group RIB in 230, N3 204 may generate a forwarding information base (FIB) to dictate routes for transmission of data (e.g., N3 group FIB 232).

Figure 2C:
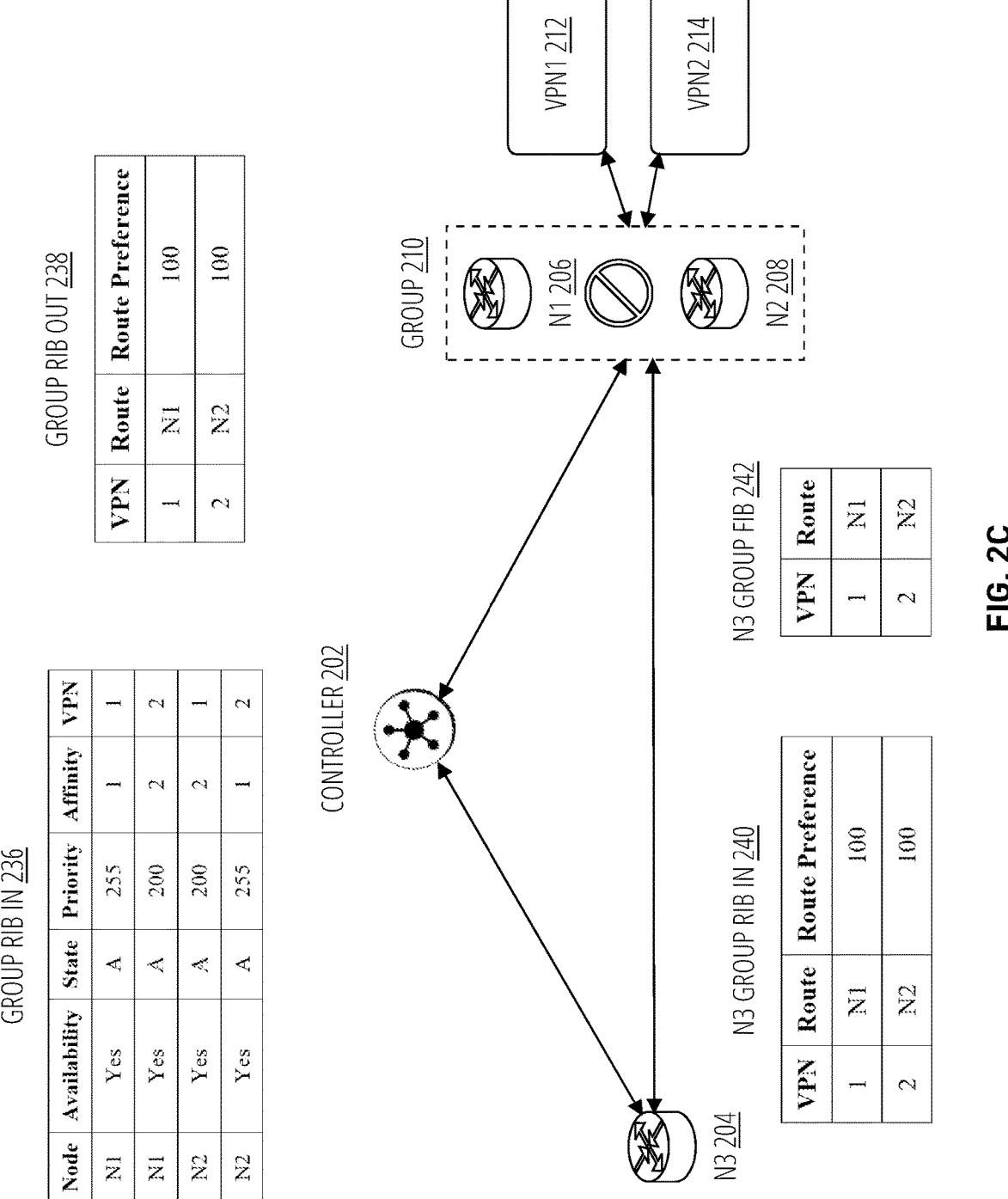
FIG. 2C illustrates an example diagram illustrating symmetric routing and split-brain handling using route priority and route affinity in high availability networks after a peer-link failure according to some aspects of the present disclosure.

FIG. 2C illustrates an example diagram illustrating symmetric routing and split-brain handling using route priority and route affinity in high availability networks after a peer-link failure according to some aspects of the present disclosure. A peer-link failure in HA networking typically refers to a disruption or failure in the communication link between two peer devices within a HA pair (e.g., N1 206 and N2 208). The peer-link between these HA pairs is crucial, as it allows them to exchange information, synchronize states, and coordinate their activities. The failure of a peer-link can have significant implications for the HA system, potentially leading to a loss of synchronization between the devices and impacting the overall high availability of the network. For example, upon failure of the peer-link between N1 206 and N2 208, the two nodes may be unaware of the status of the other node, and may therefore be advertising that they are "active" for all routes. This is demonstrated in group RIB in 236, where the "state" of each node is indicated as "active" for all routes.

Using the route priority and the route affinity associated with the routes included in group 210, controller 202 may determine the route preference without reliance on solely the "state" of the nodes advertised by nodes of the group 210. For example, controller 202 may, upon identifying the split-brain issue between N1 206 and N2 208, determine that N1 to VPN1 212 is the preferred route and N2 to VPN2 214 is the preferred route according to route affinity. In some other examples, controller 202 may make the route preference determination according to route priority.

Using the route preference determination, controller 202 may transmit group RIB out 238 to associated nodes within the network (e.g., N3 204). Group RIB out 238 may be an updated version of group RIB out 218, as described in FIG. 2A. Using group RIB out 238, N3 204 may store and/or access a local version of group RIB out 238 (e.g., N3 group RIB in 240). N3 204 may also generate a FIB to reference when transmitting traffic to relevant nodes, such as N3 group FIB 242.

FIG. 3 illustrates an example flowchart illustrating symmetric routing and split-brain handling using route priority and route affinity in high availability networks according to some aspects of the present disclosure. Although the example routine 300 depicts a particular sequence of operations, the sequence may be altered without departing from the scope of the present disclosure. For example, some of the operations depicted may be performed in parallel or in a different sequence that does not materially affect the function of the routine 300. In other examples, different components of an example device or system that implements the routine 300 may perform functions at substantially the same time or in a specific sequence.

According to some examples, the method includes receiving, at a controller associated with a communication network, first status information associated with at least one of a first node or a second node, wherein the first node and the second node are used in service of a first VPN at block 302. For example, controller 202 may receive the first status information associated with N1 206 and/or N2 208, which may be used in service of VPN1 212, described in FIGS. 2A, 2B, and 2C. In some examples, the first status information may be data transmitted by one or more advertisements from the first node and/or the second node. The first status information may indicate that the first node is available, wherein the availability indicates the connectivity of the first node to the communication network and/or whether the node is available to send and receive traffic. In addition to the availability, the advertisement may include a state (e.g., regarding the configuration of an applicable HA pairing, such as "standby" or "active"), a route priority, a route affinity, any combination thereof, or the like.

In some examples, the first node and the second node belong to a first resource group, such as group 210, as described in FIGS. 2A, 2B, and 2C. The first resource group may service traffic to and from a first server, which may be associated with the first VPN. For example, the nodes within group 210 (e.g., N1 206 and N2 208) may service traffic to and from a server associated with VPN1 212, as described in FIGS. 2A, 2B, and 2C. The traffic may be associated with other controllers, nodes, or other components on the network. In some examples, the first node and the second node may be configured in an HA pairing, where one node is considered "active" for a particular destination and another node is considered "standby" for the particular destination. For example, the first node may be active for servicing the traffic of the first VPN and the second node may be standby for servicing traffic of the first VPN. Thus, if the first node becomes unavailable for sending and receiving traffic associated with the first VPN, the second node may be used as a secondary option for traffic.

In some examples, the server associated with the first VPN may be associated with a second VPN. The first resource group may also service traffic associated with the second VPN. In such a configuration, the first status information transmitted via advertisements of the first node and/or the second node may indicate that the second node of the first resource group is active for servicing the traffic of a second VPN and the first node is standby for servicing traffic of the second VPN. For example, N1 206 may be "standby" status for VPN2 214 and N2 208 may be "active" status for VPN2 214, as described in FIGS. 2A, 2B, and 2C.

According to some examples, the method includes determining, from the first status information, a preference associated with the first node over the second node for servicing traffic of the first VPN at block 304. For example, controller 202 may determine, using the first status information received via one or more advertisements, a preference for N1 206 over N2 208 for servicing traffic of VPN1 212, as described in FIGS. 2A, 2B, and 2C. The controller may analyze the availability, the state, the route priority, and/or the route affinity associated with the first node and the second node regarding respective routes to the first VPN. In some examples, the analysis may be a systematic and/or hierarchical determination based on the first status information. The data included within the first status information may be associated with a particular "weight" and/or influence on the preference determination. For example, the state of the second node may overrule a route priority associated with the route from the second node to the first VPN when determining the preference.

According to some examples, the method includes generating routing information for a third node of the communication network, wherein the routing information specifies that the first node is preferred for serving traffic of the first VPN, and that the second node is available, but less preferred for servicing traffic of the first VPN at block 306. For example, controller 202 may generate routing information for distribution to associated nodes on the network, such as N3 204, as described in FIGS. 2A, 2B, and 2C. The routing information generated by controller 202 may indicate that N1 206 is preferred for serving traffic of VPN1 212, and that N2 208 is still available, but less preferred for servicing traffic of VPN1 212, as described in FIGS. 2A, 2B, and 2C. The routing information may be organized in a routing information base (RIB) in a location accessible by the controller. In some examples, the controller may generate two RIB tables: an "in-bound" RIB to organize and assess the first status information received from the first node and/or the second node, and an "out-bound" RIB to transmit to one or more associated nodes on the network. The route preference may be represented by a "score," which may be a whole number from 1 to 100. For example, a route preference of "100" may indicate "most preferred" while a route preference of "1" may indicate "least preferred."

In some examples, the route preference may be determined based on a route affinity associated with one or more routes. Thus, the routing information for the third node (e.g., the "out-bound" RIB generated by the controller) specifies that the first node is preferred for serving traffic of the first VPN by indicating a route affinity toward the first node for the traffic of the first VPN. The routing information for the third node may also specify that the second node is preferred for serving traffic of the second VPN by indicating a route affinity toward the second node for the traffic of the second VPN. In some other examples, the route preference may be determined based on a route priority associated with one or more routes. Thus, the routing information for the third node includes a first priority associated with the first node and a second priority associated with the second node, and wherein the first priority and the second priority indicate a preference for the first node for the traffic of the first VPN. The first priority and the second priority may also indicate a preference for the second node for the traffic of the second VPN. In some examples, the route affinity and the route priority may be used in combination to determine the route preference and the routing information for the third node.

The first priority is generated at the first node and the second priority is generated at the second node, and wherein the first priority and the second priority are indicative of a health metric. For example, N1 206 may generate the first priority and N2 208 may generate the second priority, as described in FIGS. 2A, 2B, and 2C, and the first priority and the second priority may be indicative of a health metric. The health metric may be based on one or more factors, including, but not limited to, administrative configurations, routing protocol metrics, or other parameters specific to the routing protocol in use.

According to some examples, the method includes transmitting the routing information to the third node at block 308. For example, controller 202 may transmit the routing information (e.g., group RIB out 218, as described in FIG. 2A) to N3 204. The third node, such as N3 204, may generate an internal RIB table for reference when determining an appropriate route for traffic. In some examples, the third node may generate a forwarding information base (FIB) identifying the appropriate route for traffic to the server associated with the first resource group.

In some examples, the controller may receive second status information containing changed status information for at least one of the first node or the second node, the changed status information indicates that the first node is now active for the second VPN. The second status information may be received via one or more advertisements from the first node and/or the second node. The second status information may be transmitted due to a failure in a node, a change in configuration, a network change, an update to the server serviced by the first node and/or the second node, a hardware or software failure, any combination thereof, or the like. For example, the second status information may indicate that N1 206 is now "active" for VPN2 214, instead of "standby," as was indicated in the first status information. With the second status information, the controller may generate updated routing information for the third node indicating that the first node is preferred for serving traffic of the second VPN. The controller may generate the updated routing information using the availability, the state, a route affinity, and/or a route priority of the first node, the second node, and/or any other associated nodes. For example, the routing information may indicate a route affinity toward the first node for the traffic of the second VPN. In another example, the updated routing information for the third node includes a first priority associated with the first node and a second priority associated with the second node, and wherein the first priority and the second priority indicate a preference for the first node for the traffic of the second VPN.

Figure 4:
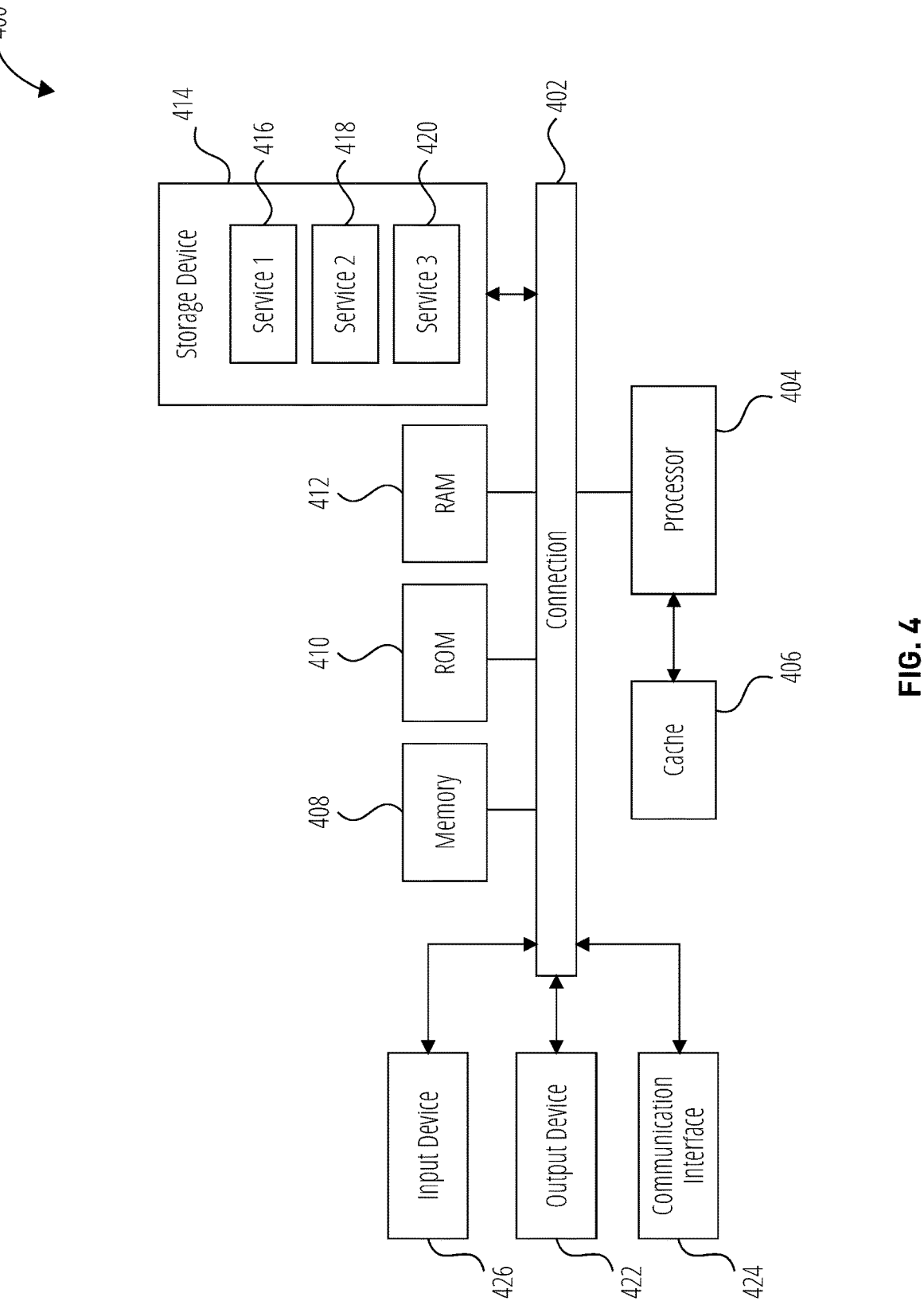
FIG. 4 shows an example of a system for implementing certain aspects of the present technology.

FIG. 4 shows an example of computing system 400, which can be for example any computing device making up a system for symmetric routing and split-brain handling using route priority and route affinity in high availability networks, such as the system illustrated in FIGS. 2A, 2B, and/or 2C, or any component thereof in which the components of the system are in communication with each other using connection 402. Connection 402 can be a physical connection via a bus, or a direct connection into processor 404, such as in a chipset architecture. Connection 402 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 400 includes at least one processing unit (CPU or processor) 404 and connection 402 that couples various system components including system memory 408, such as read-only memory (ROM) 410 and random access memory (RAM) 412 to processor 404. Computing system 400 can include a cache of high-speed memory 406 connected directly with, in close proximity to, or integrated as part of processor 404.

Processor 404 can include any general purpose processor and a hardware service or software service, such as services 416, 418, and 420 stored in storage device 414, configured to control processor 404 as well as a special-purpose processor where software instructions are incorporated into the actual processor design. Processor 404 may essentially be a completely self-contained computing system, containing multiple cores or processors, a bus, memory controller, cache, etc. A multi-core processor may be symmetric or asymmetric.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

Storage device 414 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 414 can include software services, servers, services, etc., that when the code that defines such software is executed by the processor 404, it causes the system to perform a function. In some embodiments, a hardware service that performs a particular function can include the software component stored in a computer-readable medium in connection with the necessary hardware components, such as processor 404, connection 402, output device 422, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for symmetric routing and split-brain handling, comprising:

receiving, at a controller associated with a communication network, first status information associated with at least one of a first node or a second node, wherein the first node and the second node are used in service of a first VPN;

in response to the first status information indicating that both the first node and the second node are advertising an active state for the first VPN, thereby indicating a split-brain condition, determining, from the first status information, a preference associated with the first node over the second node for servicing traffic of the first VPN by analyzing a route priority and a route affinity for each of the first and second nodes to resolve the split-brain condition; and generating routing information for a third node of the communication network, wherein the routing information specifies that the first node is preferred for serving traffic of the first VPN, and that the second node is available, but less preferred for servicing traffic of the first VPN; and transmitting the routing information to the third node.

2. The computer-implemented method of claim 1, wherein the first node and the second node belong to a first resource group, the first resource group services traffic to and from a first server, and wherein the first node is active for servicing the traffic of the first VPN and the second node is standby for servicing traffic of the first VPN.

3. The computer-implemented method of claim 2, wherein the routing information for the third node specifies that the first node is preferred for serving traffic of the first VPN by indicating a route affinity toward the first node for the traffic of the first VPN.

4. The computer-implemented method of claim 2, wherein the routing information for the third node includes a first priority associated with the first node and a second priority associated with the second node, and wherein the first priority and the second priority indicate a preference for the first node for the traffic of the first VPN.

5. The computer-implemented method of claim 4, wherein the first priority is generated at the first node and the second priority is generated at the second node, and wherein the first priority and the second priority are indicative of a health metric.

6. The computer-implemented method of claim 2, wherein the first status information indicates that the second node of the first resource group is active for servicing traffic of a second VPN and the first node is standby for servicing traffic of the second VPN, and wherein the routing information for the third node specifies that the second node is preferred for serving traffic of the second VPN by indicating a route affinity toward the second node for the traffic of the second VPN.

7. The computer-implemented method of claim 6, wherein the routing information for the third node includes a first priority associated with the first node and a second priority associated with the second node, and wherein the first priority and the second priority indicate a preference for the second node for the traffic of the second VPN.

8. The computer-implemented method of claim 1, wherein the first status information indicates that the first node is available, wherein the availability indicates the connectivity of the first node to the communication network.

9. The computer-implemented method of claim 1, further comprising:

receiving second status information containing changed status information for at least one of the first node or the second node, wherein the changed status information includes a route affinity inversion for the first node and the second node that indicates that the first node is now active for the second VPN;

generating updated routing information for the third node indicating that the first node is preferred for serving traffic of the second VPN according to the route affinity inversion.

10. The computer-implemented method of claim 9, wherein the updated routing information for the third node includes a first priority associated with the first node and a second priority associated with the second node, and wherein the first priority and the second priority indicate a preference for the first node for the traffic of the second VPN.

11. A system comprising: one or more processors; and a memory storing instructions that, when executed by the one or more processors, configure the system to:

receive, at a controller associated with a communication network, first status information associated with at least one of a first node or a second node, wherein the first node and the second node are used in service of a first VPN;

in response to the first status information indicating that both the first node and the second node are advertising an active state for the first VPN, thereby indicating a split-brain condition, determine, from the first status information, a preference associated with the first node over the second node for servicing traffic of the first VPN by analyzing a route priority and a route affinity for each of the first and second nodes to resolve the split-brain condition; and generate routing information for a third node of the communication network, wherein the routing information specifies that the first node is preferred for serving traffic of the first VPN, and that the second node is available, but less preferred for servicing traffic of the first VPN; and transmit the routing information to the third node.

12. The system of claim 11, wherein the first node and the second node belong to a first resource group, the first resource group services traffic to and from a first server, and wherein the first node is active for servicing the traffic of the first VPN and the second node is standby for servicing traffic of the first VPN.

13. The system of claim 12, wherein the routing information for the third node specifies that the first node is preferred for serving traffic of the first VPN by indicating a route affinity toward the first node for the traffic of the first VPN.

14. The system of claim 12, wherein the routing information for the third node includes a first priority associated with the first node and a second priority associated with the second node, and wherein the first priority and the second priority indicate a preference for the first node for the traffic of the first VPN.

15. The system of claim 14, wherein the first priority is generated at the first node and the second priority is generated at the second node, and wherein the first priority and the second priority are indicative of a health metric.

16. The system of claim 12, wherein the first status information indicates that the second node of the first resource group is active for servicing the traffic of a second VPN and the first node is standby for servicing traffic of the second VPN, and wherein the routing information for the third node specifies that the second node is preferred for serving traffic of the second VPN by indicating a route affinity toward the second node for the traffic of the second VPN.

17. The system of claim 16, wherein the routing information for the third node includes a first priority associated with the first node and a second priority associated with the second node, and wherein the first priority and the second priority indicate a preference for the second node for the traffic of the second VPN.

18. The system of claim 11, wherein the first status information indicates that the first node is available, wherein the availability indicates the connectivity of the first node to the communication network.

19. The system of claim 11, wherein the instructions further configure the apparatus to:

receive second status information containing changed status information for at least one of the first node or the second node, wherein the changed status information includes a route affinity inversion for the first node and the second node that indicates that the first node is now active for the second VPN;

generate updated routing information for the third node indicating that the first node is preferred for serving traffic of the second VPN according to the route affinity inversion.

20. A non-transitory computer-readable storage medium, the non-transitory computer-readable storage medium including instructions that when executed by a computer, cause the computer to:

receive, at a controller associated with a communication network, first status information associated with at least one of a first node or a second node, wherein the first node and the second node are used in service of a first VPN;

in response to the first status information indicating that both the first node and the second node are advertising an active state for the first VPN, thereby indicating a split-brain condition, determine, from the first status information, a preference associated with the first node over the second node for servicing traffic of the first VPN by analyzing a route priority and a route affinity for each of the first and second nodes to resolve the split-brain condition; and generate routing information for a third node of the communication network, wherein the routing information specifies that the first node is preferred for serving traffic of the first VPN, and that the second node is available, but less preferred for servicing traffic of the first VPN; and transmit the routing information to the third node.

* * * * *